June 28, 1949.　　　　　G. RATTRAY　　　　　2,474,323
CAMERA FOR PHOTOGRAPHING OBJECTS
MOVING RELATIVELY TO THE CAMERA
Filed Sept. 20, 1944　　　　　　　　　　　4 Sheets-Sheet 1
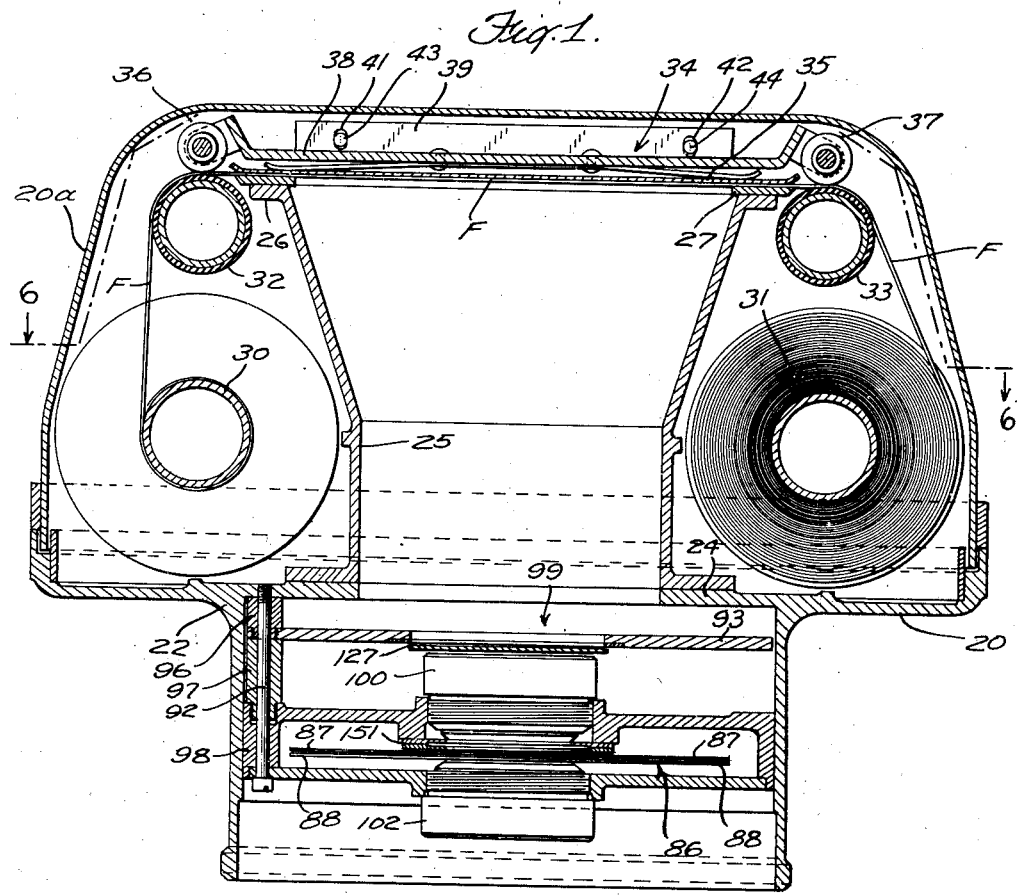
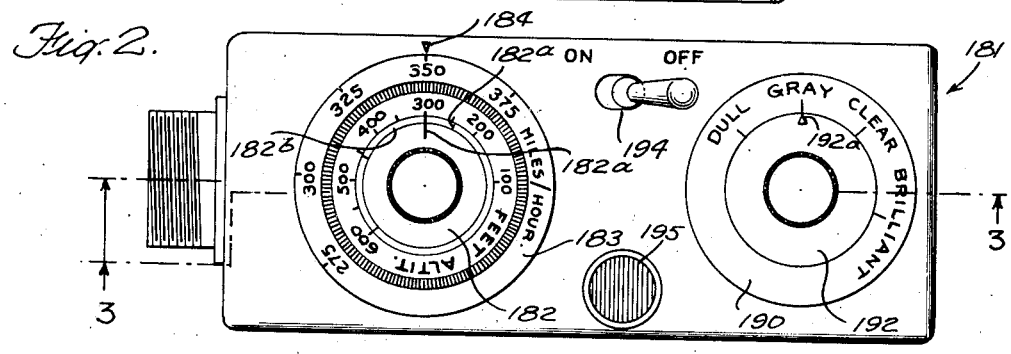
INVENTOR
GEORGE RATTRAY
BY
Blair, Curtis & Hayward
ATTORNEYS INVENTOR
GEORGE RATTRAY
BY
Blair, Curtis + Hayward
ATTORNEYS June 28, 1949.　　　　　G. RATTRAY　　　　　2,474,323
CAMERA FOR PHOTOGRAPHING OBJECTS
MOVING RELATIVELY TO THE CAMERA
Filed Sept. 20, 1944　　　　　　　　　　　　　　4 Sheets-Sheet 3

INVENTOR
GEORGE RATTRAY
BY
Blair, Curtis & Hayward
ATTORNEYS

June 28, 1949.　　　　G. RATTRAY　　　　2,474,323
CAMERA FOR PHOTOGRAPHING OBJECTS
MOVING RELATIVELY TO THE CAMERA
Filed Sept. 20, 1944　　　　　　　　　　4 Sheets-Sheet 4

INVENTOR
GEORGE RATTRAY
BY
Blair, Curtis & Hayward
ATTORNEYS

Patented June 28, 1949

2,474,323

UNITED STATES PATENT OFFICE 2,474,323

CAMERA FOR PHOTOGRAPHING OBJECTS MOVING RELATIVELY TO THE CAMERA

George Rattray, Mineola, N. Y., assignor to Fairchild Camera and Instrument Corporation, Jamaica, N. Y., a corporation of Delaware Application September 20, 1944, Serial No. 554,899

4 Claims. (Cl. 95—12.5)

1

This invention relates to camera construction, and more particularly to an aerial camera.

In certain types of aerial photography, for example, military reconnaissance, it is often necessary that the mission be conducted at altitudes ranging from 100 to 800 feet above the terrain being reconnoitered, i. e. altitudes which are quite low relative to those at which normal mapping missions are conducted. At such low altitudes a relatively slow airplane would be too good a target for ground and airborne antiaircraft. Accordingly the airplane in which the camera is installed is usually of the pursuit or interceptor type, unarmed and relying for its safety on its high speed and maneuverability.

As modern pursuit or interceptor types are capable of extremely high speeds, for example, 400 M. P. H. or better, image motion across the focal plane of a camera mounted in such a plane flying at the above-noted low altitudes is substantial in comparison to such motion at much greater altitudes and at slower speeds. Unless this image motion is compensated for, the resulting photographs are unsatisfactory for lack of definition. Because of the high speed and low altitude of operation, it is necessary to make exposures as rapidly as possible in order to provide sufficient overlap between successive exposures. While a focal plane shutter is capable of high speeds, it is impractical for use in a camera of this character for various reasons. Thus a type of between-the-lens shutter is in many cases prerequisite in spite of its lower maximum shutter speed. With such lower shutter speeds, it is practically impossible to stop image motion and a blurred picture results. Hence compensation for such image motion is necessary. While cameras have been proposed wherein movement is imparted to the film during the exposure period, presumably for the purpose of neutralizing ground motion, they are largely unsatisfactory by reason of their inability to synchronize shutter speed and film movement, provide sufficient and accurate overlap if any, be remotely operated and controlled, provide film movement accurately related to the image movement across the focal plane, and provide automatic compensation between the diaphragm opening and shutter speed. It is accordingly among the objects of this invention to provide a camera capable of attaining these ends, in addition to others.

The invention accordingly consists in the features of construction, combinations of elements, and arrangements of parts, as will be exemplified in the structure to be hereinafter described, and

2 the scope of the application of which will be indicated in the following claims.

In the drawing, wherein there is shown one form of the invention,

Figure 1 is a sectional elevation, taken along the line 1—1 of Figure 6, showing in general the film magazine and shutter and lens mounting;

Figure 2 is a top plan view of the remote control box;

Figure 3 is a section on a reduced scale taken along the line 3—3 of Figure 2;

Similar reference characters refer to similar parts throughout the views of the drawing.

Figure 4:
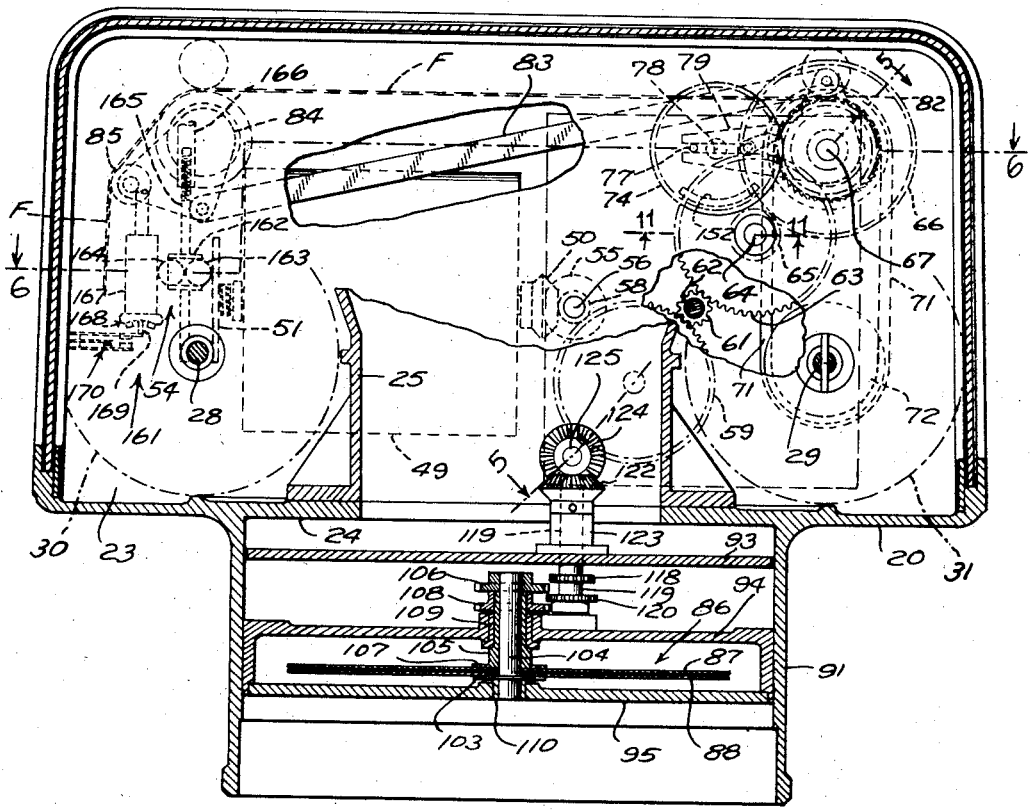
Figure 4 is a horizontal section of the camera showing the film and shutter driving mechanism, together with the automatic speed control therefor.

In accordance with my invention, the camera is preferably of minimum size and weight consistent with picture size and magazine capacity. Illustratively, the weight of the camera is approximately 20 pounds taking a picture 5" x 5" on a standard aerial roll film, the size of the camera being so related to the size of the film as to enable the taking of approximately 150 exposures. Preferably the magazine is an integral part of the camera, and is provided with a removable light-tight cover for ease of loading, a film indicator being provided on the outside of the magazine to indicate the amount of film remaining therein.

The camera is provided with an anastigmat lens of appropriate focal length and aperture, and is set at suitable focus so that everything at distances greater than 100', for example, is in satisfactorily sharp focus. The camera mechanism is driven by an electric motor operated from the airplane power source, and its speed is automatically controlled in accordance with the altitude and speed of the airplane during the mission. The motor not only drives the shutter which can be of the simple double disc type located between the lens elements, but also drives the film at a speed equivalent to the speed of the image across the focal plane and in the same direction at the time of exposure. Between exposures the film is driven at a greater speed so as to provide a suitable amount of overlap between successive exposures for any mean altitude setting.

As noted above, the shutter is of the revolving disc type, and an auxiliary shutter controlled by a solenoid is used to time the interval between exposures. This auxiliary shutter prevents light from entering the camera through the lens when the camera is not in use. The shutter and film driving mechanisms are geared together, i. e. are positively driven and accordingly the shutter speed varies with the film speed, which is controlled to be synchronous with the velocity of the image on the focal plane. For example, at low altitudes and high plane speeds, the motion of the film is greatest, and therefore the shutter speed is highest. Conversely, at high altitudes and low plane speeds the motion of the image is relatively slow; therefore the film and shutter speed are relatively low. Preferably the shutter speeds are selective between $1/75$ of a second to $1/450$ of a second, thus providing sufficient light under conditions generally encountered in actual use, and at the same time providing sufficiently high shutter speeds to prevent excessive blurring from vibration or from other errors in synchronizing the film and image speeds.

The lens is also provided with a diaphragm mounted between the lens elements, and is controlled by means of a remote diaphragm knob accessible to the pilot. This remote control knob constitutes a portion of a remote control box mounted in the airplane cockpit, the control box also including a speed control knob.

Referring now to Figure 1, the camera includes a housing 20, which is divided by a partition 21 (Figure 6) to provide a film magazine 22 and a compartment 23, the former of which contains the film, and the latter of which contains the operating mechanism. These compartments are covered by a removable light tight cover 20a. As shown in Figure 1, housing 20 includes an inner, annular flange 24 which forms a support for a funnel-shaped cone 25, the bottom of which is fastened to the flange in any suitable manner. The upper end of cone 25 flares outwardly and has at its top a transverse annular flange 26 which carries an apertured plate 27, the top surface of which defines the camera's focal plane.

On opposite sides of cone 25 within magazine 22 are suitable pivots 28 and 29 (Figure 4) on which are mounted film supply and take-up spools 30 and 31 (Figure 1) respectively. Film F is drawn from supply spool 30 over a guide roller 32, across the upper surface of member 27, i. e. across the focal plane, over another guide roller 33, and is wound on take-up spool 31. To hold film F in the focal plane, a pressure plate, generally indicated at 34, is mounted in any suitable manner within the film magazine 22, and includes a spring-pressed plate 35 flared at its opposite ends and adapted to rest on top of the film to hold it in the focal plane. Pressure plate 34 also carries at its opposite ends a pair of rubber covered pressure rollers 36 and 37, the latter of which is driven in a manner to be described, to feed the film across the focal plane.

Figure 6:
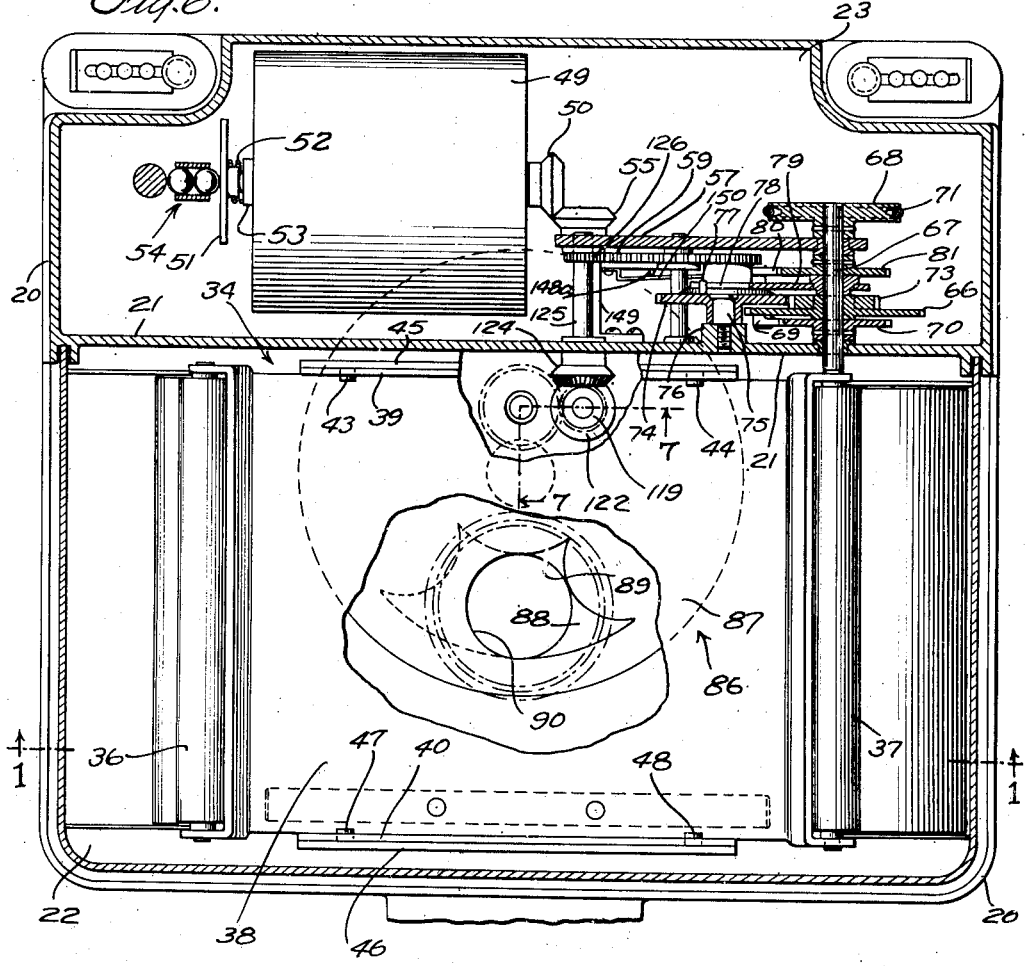
Figure 6 is a section taken along the line 6—6 of Figure 4.

As shown in Figure 6, pressure plate 34 includes a body 38 having upstruck flanges 39 and 40 at opposite sides thereof. Each of these flanges as, for example, flange 39 (Figure 1) has a pair of slots 41 and 42 formed therein through which pins 43 and 44 extend, respectively. Referring back to Figure 6, these pins 43 and 44 are mounted on and extend from a plate 45 fastened in any suitable manner to camera housing 20. At the opposite side of pressure plate 34 is a plate 46 similar to plate 45 and carrying pins 47 and 48 which extend through slots in flange 40. Plates 45 and 46 are separable to permit the installation into or removal of pressure plate 34 from its operating position, as shown. Thus when it is necessary to remove exposed film from the magazine or to initially load the magazine with film, the pressure plate may readily be removed to facilitate either of these operations, thus avoiding threading of the film between the pressure plate and the focal plane.

The driving mechanism in compartment 23 (Figure 6) is operated by a relatively high speed electric motor 49, the armature shaft of which carries at one end a bevel gear 50, and at the other end a friction plate 51 preferably splined or keyed to the armature shaft but movable axially thereof. A spring 52 is disposed between pressure plate 51, and a boss 53 on the motor casing to bias friction plate 51 to the left, as viewed in Figure 6, against a ball drive generally indicated at 54 which will be described hereinbelow.

Bevel gear 50 meshes with a bevel gear 55 fastened to one end of a shaft 56 (Figure 4) one end of this shaft being journaled in a plate 57 (Figure 6) suitably mounted in compartment 23, the other end of the shaft being carried by partition 21. Shaft 56 has secured thereto a pinion 58 which meshes with a gear 59 (see Figure 5) pinned to a shaft 60, journaled in plate 57 and partition 21. Gear 59, in turn, meshes with a pinion 61 carried by a shaft 62 whose opposite ends are also rotatably mounted in plate 57 and partition 21, respectively. Pinion 61 meshes with a large gear 63 carried by a similarly mounted shaft 64 to which is secured a small pinion 65 which meshes with a large gear 66 loosely mounted on a shaft 67 journaled in plate 57 and partition 21, the opposite ends of the shaft extending through and beyond the plate and partition. One end 67a of shaft 67 has pinned thereto a pulley 68, the other end 67b of this shaft being provided with a detachable coupling (not shown) by which metering roller 37 (see also Figure 6) may be attached to the shaft when pressure plate 34 is installed.

Gear 66 has pivotally mounted thereon a pawl 69 which is spring-biased by a spring (not shown) into ratcheting engagement with a ratchet wheel 70 pinned to shaft 67. It will now appear that when gear 66 is driven by motor 49 through the gear train hereinbefore described, shaft 67 and accordingly metering roller 37 are driven, by reason of the driving connection between gear 66 and ratchet 70 formed by pawl 69. Inasmuch as metering roller 37 presses film F (Figure 1) against guide roller 33, the film is fed between these two rollers. Pulley 68 is connected by means of a slip belt 71 to a pulley 72, which is fastened to the spindle 29 of film take-up roller 31 (Figure 1) so that as metering roller 37 feeds the film in the manner described, the take-up roll is driven so as to wind the film thereon.

As noted hereinabove, it is desirable to drive or feed the film at a greater rate between successive exposures in order to obtain sufficient overlap between successive pictures. To this end, gear 66 (Figure 6) carries a smaller gear 73 which meshes with a gear 74 rotatably mounted on a screw stud 75 fastened in a boss formed on partition 21. Gear 74 carries a pin 77 which, as the gear rotates, reciprocates within a slot 78 (Figure 4) formed in an arm 79 which is rockably mounted on shaft 67. Arm 79 (Figure 6) has pivotally mounted thereon a pawl 80 which is spring-biased into ratcheting engagement with a ratchet wheel 81 pinned to shaft 67. Thus, as gear 74 rotates, the pin 77 carried thereby imparts oscillatory motion to arm 79 which, through pawl 80 and ratchet 81, drives shaft 67 and accordingly metering roll 37 whenever the angular velocity of arm 79 is greater than and in the same direction as the angular velocity of driving gear 66. The various gears and lever arm 79 are so arranged that the angular velocity of the arm is greater than that of gear 66 immediately following an exposure, so that the film feed rate is greater between exposures, thus providing the desired overlap.

Arm 79 (Figure 4) includes a projection 82 to which is pivotally attached one end of a link 83, the other end thereof being pivotally attached to a plate 84 rockably mounted in any suitable manner and carrying a compensating roller 85. At the beginning and end of the period of relatively slow film movement during which an exposure is made, plate 84 is in the position shown in Figure 4, and during the period of relatively slow film movement the plate is displaced somewhat clockwise from this position so that at, during and at the end of the period of slow speed film movement, compensating roller 85 forms a loop in film F. When, however, the film is fed at the faster rate between exposures, as described, plate 84 is displaced counterclockwise from the position shown in Figure 4, thus to provide slack in the film and hence allow for the rapid acceleration thereof during the faster film feed. By the same token, the mechanism described provides a means for decelerating the film at the end of the rapid feed rate. In other words, the linkage and plate control the size of the film loop to prevent rapid acceleration and deceleration of the film supply spool, which would otherwise present difficulties by reason of the inertia thereof on one hand, and the momentum thereof on the other.

It may now be seen that the film may be driven at a constant rate during a definite period within which an exposure is made, and as will appear hereinafter, this feed rate is synchronized with movement of the ground image across the focal plane. It also may be seen that the film may be driven at a considerably more rapid rate between exposures to provide the requisite overlap therebetween.

As hereinbefore noted, the camera is provided with a between-the-lens shutter, this shutter being generally indicated at 86 (Figure 4) and comprising a pair of rotatable discs 87 and 88. These discs are respectively provided with openings 89 and 90 (Figure 6) which are identical in shape and radial location, each opening lying between the center and periphery of its disc. Shutter 86 is operably mounted in a manner to be hereinafter described within a barrel portion 91 (Figure 9) which is preferably integral with and extends from camera housing 20. Disposed within barrel 91 and secured to housing flange 24, as by one or more screws 92 are three apertured plates or partitions 93, 94 and 95. These partitions are held in properly spaced relationship from one another and from housing flange 24 by spacers 96, 97 and 98, through which screw 92 preferably extends, the screw being threaded into flange 24. Partition 93 pivotally supports an auxiliary shutter 99, described in detail hereinafter; partition 94 detachably carries a lens element 100, as well as a diaphragm 101; and partition 95 detachably supports another lens element 102, shutter 86 being disposed between lens elements 100 and 102.

Figure 5:
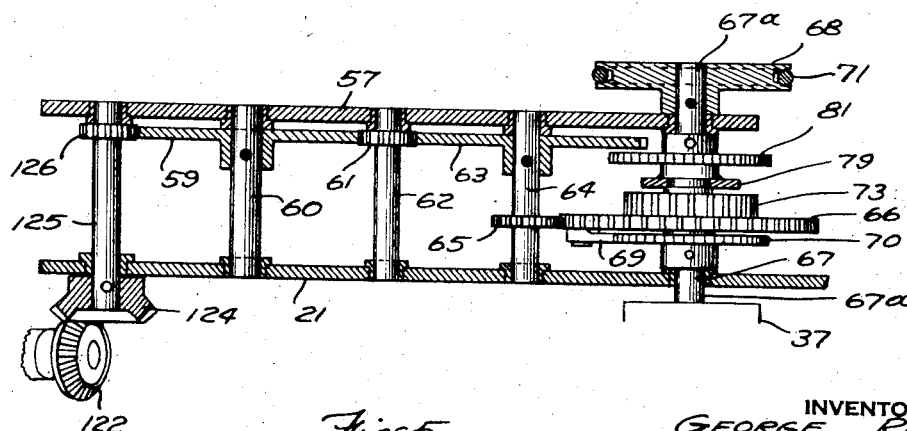
Figure 5 is a section on an enlarged scale, taken along the line 5—5 of Figure 4.

As shown in Figure 4, shutter disc 88 is attached as by a washer or disc 103 to a stud 104 which is rotatably mounted in a sleeve 105, stud 104 carrying at its upper end a pinion 106. Shutter disc 87 is in turn fastened to a flange 107 on sleeve 105, the sleeve carrying at its upper end a pinion 108. Sleeve 105 is journaled in bushings 109 and 110 mounted respectively in partitions 94 and 95. Thus it may be seen that the shutter discs 87 and 88 are freely rotatable relative to one another, and may be independently driven through their respective pinions 108 and 106 by motor 49, in a manner which will now be described.

Figure 7:
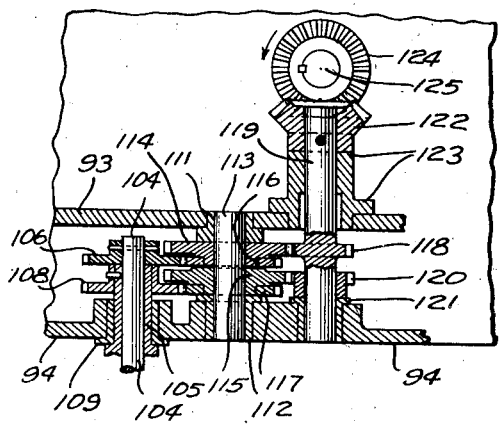
Figure 7 is a fragmentary developed section on an enlarged scale taken along the line 7—7 of Figure 6.

As shown in Figure 7, partitions 93 and 94 carry respectively bushings 111 and 112 in which a stud shaft 113 is rotatably mounted. Fastened to this shaft are a pair of gears 114 and 115, to the hubs of which are fastened respectively pinions 116 and 117. Pinion 116 meshes with pinion 106, pinion 117 meshing with pinion 108. Gear 114 meshes with a gear 118 which may be formed on or secured to a shaft 119. Shaft 119 also carries another gear 120 which meshes with gear 115, the lower end of this shaft being journaled in a bushing 121 carried by partition 94. To the upper end of shaft 119 is secured a bevel gear 122, having a shank 123 which is journaled in partition 93. Thus the bevel 122 and shaft 119 are rotatably mounted in partitions 93 and 94. The diameter of gear 118 is less than that of gear 120, and the diameter of gear 114 is greater than that of gear 115, so that when these latter gears are driven, as will be described, gear 115 rotates at a more rapid rate than gear 114. As these gears 114 and 115 are connected to shutter disc pinions 106 and 108, by means of pinions 116 and 117, it accordingly follows that shutter pinion 108 and accordingly its shutter disc 87 (Figure 4) is driven at a greater velocity than is pinion 106 and its disc 88, the different velocity of the discs being provided for a purpose which will be hereinafter described.

Referring to Figure 6, bevel gear 122 meshes with a bevel gear 124 fastened to one end of a shaft 125 which is rotatably mounted in partition 21 and plate 57. Between the plate and partition, shaft 125 carries a gear 126 which meshes with gear 59 (see also Figure 5). As noted hereinabove, gear 59 is driven by motor 49 through bevel gears 50 and 55, and pinion 58 (see Figure 4). Thus is established the driving connection between motor 49 and shutter discs 88 and 87. It might here be noted for purposes of clarity, that shaft 56 (Figure 4) which carries pinion 58, i. e. the driving pinion for gear 59, underlies shaft 125 as viewed in Figure 6, these shafts accordingly being parallel, as will appear from a consideration of Figure 4. It may now be seen, with reference to Figure 4, that shutter 86 is driven by motor 49 as follows: bevel gears 50 and 55, pinion 58, gear 59, pinion 126 (Figure 5), bevel gears 124 and 122 (Figure 4) and gears 118 and 120, the former of which, as heretofore described, drives shutter disc 88, and the latter of which drives shutter disc 87, but at different speeds. The velocity differential between the shutter discs is not substantial. Thus, although an exposure can only be made when the two disc openings 89 and 90 (Figure 6) coincide in the path of light rays entering the lens aperture, the discs rotate, by reason of the motor's high R. P. M. at such a rapid rate that the period between successive coincidences of the openings is relatively short. The rate of rotation of shutter discs 87 and 88 is controllable to vary the shutter speed in the manner which will be described hereinbelow.

To assure but a single exposure per operative cycle, auxiliary or timing shutter 99 (Figure 9) is provided. This shutter comprises a disc 127 which at proper intervals opens and closes an aperture 128 formed in plate 93, the shutter disc being provided with an arm or projection 129 which is pivotally attached to plate 93 by a pivot pin 130, the shutter disc 127 accordingly being pivotable about pin 130 between the solid and broken line positions shown in Figure 8. When the disc 127 is in the broken line position, aperture 128 is open. Plate 93 (Figure 9) is provided with an annular rabbet 131 in which a ring 132 is oscillatably disposed. Ring 132 is provided with a slot 133 which receives a pin 134 carried by shutter disc projection 129; thus when the ring is oscillated, shutter disc 127 is swung about its pivot 130 by the pin and slot connection between the ring and disc.

Figure 8:
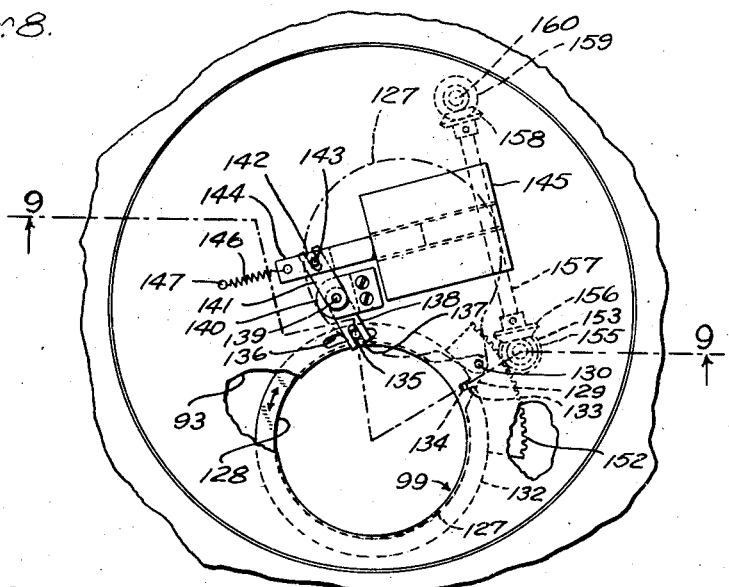
Figure 8 is a fragmentary elevation of the solenoid controlled auxiliary shutter.

Ring 132 has fastened thereto a pin 135 which, as shown in Figure 8, projects through a slot 136 in plate 93 and rides in a slot 137 formed in the free end of an arm 138. Arm 138 (Figure 9) is fastened to one end of a pin 139 pivotally disposed in a bracket 140 which is fastened to plate 93. To the other end of pin 139 is fastened an arm 141, the free end of which is slotted as at 142 (Figure 8) to receive a pin 143 attached to the outer end of the armature 144 of a solenoid 145. The extreme outer end of armature 144 carries one end of a tension spring 146, the other end of which is anchored to a pin 147 mounted on plate 93. Spring 146 thus pulls the solenoid plunger to the left, as viewed in Figure 8, withdrawing it from the solenoid coil upon deenergization thereof. When the solenoid is energized, as will be described, its plunger or armature 144 is drawn to the right against the pull of spring 146.

Figure 11:
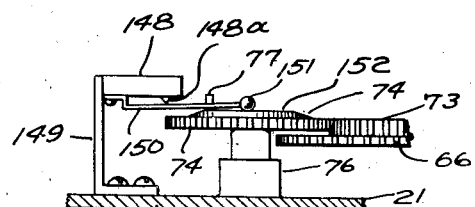
Figure 11 is a fragmentary sectional elevation taken along the line 11—11 of Figure 4.

When solenoid 145 is energized, its armature 144 is attracted to the right, as viewed in Figure 8, which pivots arms 141 and 138 clockwise. This results in counterclockwise movement of ring 132, and this movement of the ring is transmitted by way of slot 133 and pin 134 (Figure 8) to shutter disc 127 thus to rock the shutter disc clockwise, as viewed in Figure 8 to its broken line position, uncovering aperture 128. When solenoid 145 is deenergized, the reverse operation of these several parts takes place by reason of the pull of spring 146, with the result that the shutter disc pivots counterclockwise to its closed position over aperture 128. Solenoid 145 is controlled by a micro-switch 148 (Figure 11) secured to a strut 149 which is in turn fastened to partition 21. The contacts 148a of switch 148 are controlled by a resilient arm 150 which has a downward bias, as viewed in Figure 11. The free end of this arm carries a knob or button 151 which is adapted to engage a cam 152 or the like on gear 74. Cam 152 (Figure 4) is arcuate in shape and of such length as to constitute a dwell, so timed in relation to the rotation of gear 74, and accordingly the operating mechanism of the film feed drive and the shutter drive, that it causes micro-switch 148 (Figure 11) to close, thus to energize solenoid 145 only when it is desired to swing shutter disc 127 (Figure 8) away from aperture 128, i. e. when an exposure is to be made. The dwell of the cam is then so proportioned and arranged that it effects opening operation of the auxiliary shutter 99 for a period of less than that of one revolution of shutter discs 87 and 88 (Figure 6) but at the same time of the coincidence of openings 89 and 90 with the lens aperture. At all other times the microswitch 148 is open, leaving solenoid 145 deenergized and accordingly auxiliary shutter 99 closed.

Figure 9:
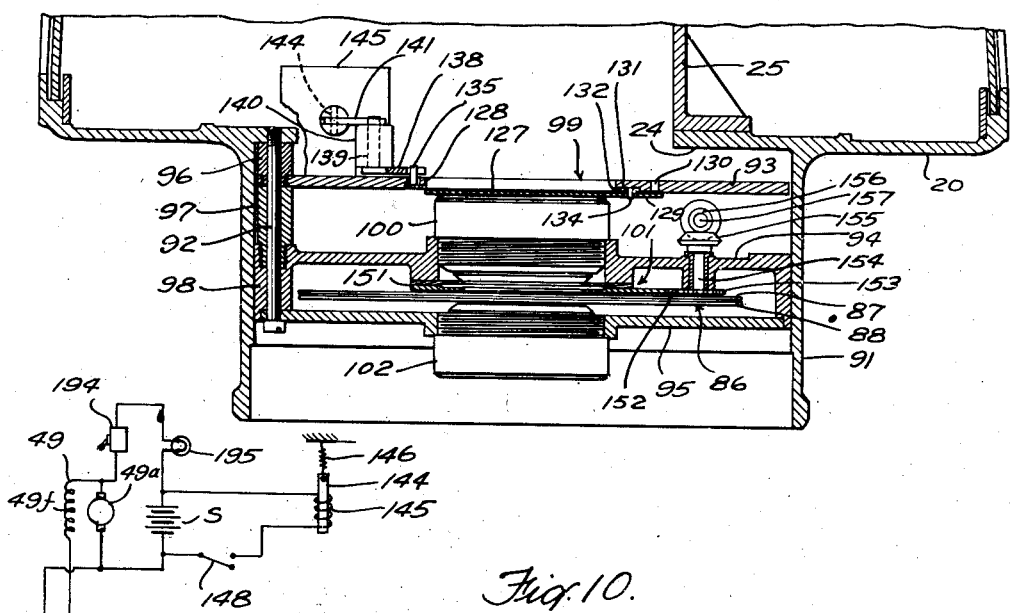
Figure 9 is a fragmentary staggered section taken along the line 9—9 of Figure 8.

As shown in Figures 8 and 9, a between-the lens iris diaphragm 151 of a conventional type is suitably mounted between lens elements 100 and 102 (Figure 9). The diaphragm aperture is adjustable and its leaves may be controlled in a conventional manner through a gear segment 152 (Figure 8) which meshes with a pinion 153 carried by the lower end of a stud 154 suitably journaled in plate 94. The other end of stud 154 carries a bevel gear 155 which meshes with a similar bevel gear 156 (Figure 8) carried by one end of a shaft 157. The other end of this shaft has fastened thereto a bevel gear 158 which meshes with another bevel gear 159 on one end of a shaft 160, the other end of which extends to and through the camera wall, where it is provided with a suitable coupling (not shown). Thus, by means of such coupling and through the gear train described, the aperture of diaphragm 151 (Figure 9) may be varied as desired.

As noted hereinbefore, shutter 86 (Figures 4 and 6) may be operated at any speed within limits, the particular speed of operation being determined and set in accordance with any particular combination of the factors of altitude, air speed and atmospheric condition, as will be described hereinafter. Variation of the shutter speed is effected by controlling, or rather varying, the motor speed by means of a variable speed governor 169. The rate of film movement is, of course, controlled in the same manner, inasmuch as the film also is driven by the motor. Thus, referring to Figure 4, friction plate 51 which, as hereinbefore noted, is attached to one end of the armature shaft of motor 49, and is pressed against the adjustable ball drive 54, this drive comprising a cage 162 which carries a pair of balls 163 and 164. Cage 162 is fastened to a rod 165, the upper end of which is threadably received in a rotatable shaft 166, the upper end of which extends through the camera wall and is provided with a detachable coupling (not shown) by which the shaft may be rotated in one direction or another so as to reciprocate rod 165 thereby to vary the radial position of the ball drive 54 in relation to the face of friction plate 51. Thus the ball drive operates at greater speeds as its position approaches the periphery of friction plate 51.

Ball 163 bears against friction plate 51, and also engages ball 164 which in turn bears against a roller 167 rotatably mounted in any suitable manner within compartment 23. This roller carries conventional flyweights generally indicated at 168 and constitutes the governor which maintains rotation of the roller at a predetermined fixed rate. Thus, for any given position of the ball drive 54, the speed of motor 49 is fixed at a predetermined value. Should the motor speed exceed or be less than the value corresponding to the adjusted setting of the ball drive, the governor flyweights 168 react accordingly to actuate a pin 169 which, in turn, controls a switch generally indicated at 170. This switch, in turn, controls motor 49 to increase or decrease the motor speed to the desired value, in a manner that will be described hereinafter.

Figure 10:
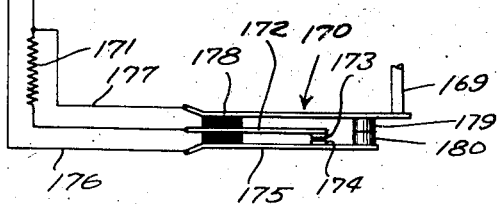
Figure 10 is the wiring diagram of the motor control circuit.

As shown in Figure 10, the armature 49a of motor 49 is connected across a source S which may be the power supply of the airplane or an independent supply, as desired. The motor field 49f is connected through a series resistance 171 to a switch arm 172 carrying a contact 173 adapted to make and break with a contact 174 carried by an arm 175. Arm 175 is connected by a line 176 to one side of source S. Motor field 49f is also connected by way of a lead 177 with another arm 178 of switch 170 to which is attached a contact 179 adapted to make and break with a contact 180 carried by arm 175. Arms 172, 175 and 178 are all resilient and are so arranged that when pin 169 is moved upwardly as viewed in Figure 10, through the operation of the governor flyweights, as heretofore described, contacts 173 and 174 engage before contacts 179 and 180 separate to prevent arcing. When these contacts 173 and 174 engage, resistance 171 is switched into the field 49f of motor 49, causing an increase in the motor speed. By the same token, when contacts 179 and 180 engage and contacts 173 and 174 are disengaged, resistance 171 is shunted out of the circuit of the motor's field, thereby reducing the motor speed. Thus it will appear that governor 161 (Figure 4) maintains the speed of operation of motor 49 at a substantially constant value corresponding to the setting of ball drive 54.

As noted hereinabove, the speed of operation of motor 49 is determined by the factors of altitude, air speed and atmospheric condition. To this end a remote control box, generally indicated at 181 (Figures 2 and 3) is provided, and it is by this control box that the interconnection of the factors of speed, altitude and atmospheric condition, i. e. motor speed and diaphragm setting is effected. Control box 181 may be located in any convenient portion of the airplane, as for example, in the cockpit thereof, so as to be readily accessible to the pilot. Altitude and air speed settings are obtained respectively by means of a knob 182 and a dial 183, the knob being provided with an index 182a, the dial being engraved with altitude and air speed values, the altitude value scale lying within the air speed scale, so that its graduations are individually registrable with the index or pointer 182a on knob 182. The air speed values are on the outer scale of the dial and are selectively registrable with a stationary index 184 engraved on the top cover of control box 181.

As shown in Figure 3, knob 182 is fastened to the upper end of a shaft 185 which is journaled in the top and bottom plates of the box and has its bottom end provided with a coupling 186. Dial 183 is mounted on shaft 185 for free rotation relative thereto and accordingly relative to knob 182. Also attached to shaft 185 but within box 181 is a gear 187 which, through an idler 188, rotatably secured to the top cover of the box, drives another gear 189 which is fastened to, so as to rotate another dial 190. Dial 190 is freely rotatable relative to a second shaft 191, rotatably mounted in box 181, and carrying at its upper end a knob 192, and at its lower end a coupling 193. Dial 190 is graduated in accordance with the factor of atmospheric condition, and accordingly may be provided with conventional diaphragm stop indicia, but preferably is marked, as indicated in Figure 2, i. e. "Dull," "Gray," "Clear" and 'Brilliant." Knob 192 is also provided with an index 192a.

Coupling 186 (Figure 3) is attached as by a flexible cable (not shown) to the coupling for the adjustable ball drive 54 (Figure 4), whereas coupling 193 (Figure 3) is connected by a flexible cable (not shown) to the coupling through which the iris diaphragm 151 (Figure 9) is adjusted.

With the control box as described, the film and shutter speeds may be adjusted as follows: before approaching the target to be photographed, dial 183 (Figures 2 and 3) is set to the correct air speed, as indicated by the pilot's air speed meter. Knob 182 is then rotated until its index 182a matches the altitude marking on dial 183, in accordance with the reading from the pilot's altimeter, or which is in accord with the altitude at which the pilot intends to fly above the target. It should be noted at this point that knob 182 also includes reference marks 182b and 182a to indicate the permissible variation in altitude. These marks thus indicate the maximum and minimum altitude at which the pilot can fly without resulting in excessive relative motion between the image and film. Rotation of knob 182 as it is adjusted, of course, operates the gear train 187, 188 and 189, causing rotation of the atmospheric condition dial 190. Hence, after the altitude and air speed values have been set, it but remains for the pilot to adjust knob 192 to the proper marking on dial 190 in accordance with the atmospheric condition over the target. Thus, by the setting of the controls in control box 181, the proper shutter and film speed, as well as diaphragm opening, is selected, resulting in synchronization of the shutter and film speeds with the velocity of the image on a focal plane.

Control box 181 also includes a main switch 194 which, as shown in Figure 10, is connected in series with motor 49, a jewel light 195 also being included in this circuit to indicate the operative condition of the motor. If desired, the jewel light 195 may be so connected that when the camera switch 194 is turned on, and the camera begins to operate, the light will flash once for each exposure of the camera. Thus the light may be operated from a switch (not shown) driven by the camera film itself, so as to serve as an indication that the film is properly moving through the camera.

If desired, another switch (not shown) may be built into the camera, which will break all circuits, stopping the camera and turning out the indicator light when all of the film has been used.

Although the altitude, air speed and diaphragm controls have been shown as located in the remote control box 181, so as to enable the pilot to control the camera remotely, it is to be understood that these controls may be duplicated in the camera itself to enable the operator of the camera to make his settings at the camera, should it prove convenient.

Accordingly I have provided a camera which attains the several objects set forth hereinabove in a thoroughly practical and efficient manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In camera construction, in combination, a film magazine adapted to receive strip film, means for moving film across the focal plane of the camera during the exposure period, film feeding means associated with and operated by said film moving means for moving said film in the same direction between exposures but at a faster rate than during an exposure, and means operated by said film moving means for creating slack at the supply end of said film as the movement of said film accelerates during its period of faster movement between exposures.

2. Apparatus according to claim 1 wherein the slack creating means is positively connected by a link to the film moving means so as to be positively driven thereby to respond to the faster operation of the film moving means thus to create slack in the film during the faster movement of the film between exposures.

3. Apparatus according to claim 1 wherein the slack creating means includes a roller in engagement with the film, means mounting said roller for movement transversely of the path of movement of the film, and link means connecting said roller mounting means to said film moving means so as to be positively driven thereby thus to effect slack creating movement of said roller as said film is moved at said faster rate.

4. In camera construction, in combination, a film magazine adapted to receive strip film, means for moving film across the focal plane of the camera during the exposure period, means for moving said film in the same direction between exposures but at a faster rate than during an exposure, and means linked to said film moving means and positively driven thereby for creating a slack at the supply end of said film as the movement of said film accelerates during its period of faster movement between exposures, said last-mentioned means also being operable to absorb slack in said film during the latter portion of its increased rate of movement.

GEORGE RATTRAY.

REFERENCES CITED

The following references are of record in the file of this patent:

UNITED STATES PATENTS

| Number | Name | Date |
| --- | --- | --- |
| 1,112,751 | Armat | Oct. 6, 1914 |
| 1,413,187 | Paumier | Apr. 18, 1922 |
| 1,586,071 | Cooke | May 25, 1926 |
| 1,817,182 | Fairchild | Aug. 4, 1931 |
| 1,848,693 | Briechle | Mar. 8, 1932 |
| 1,898,179 | Graham | Feb. 21, 1933 |
| 1,939,172 | Jenkins | Dec. 12, 1933 |
| 2,257,100 | Belock | Sept. 30, 1941 |
| 2,307,646 | Sonne | Jan. 5, 1943 |
| 2,327,581 | Del Riccio | Aug. 24, 1943 |
| 2,333,768 | Davies et al. | Nov. 9, 1943 |
| 2,358,323 | Frankel | Sept. 19, 1944 |
| 2,397,031 | Merritt et al. | Mar. 19, 1946 |